UNITED STATES PATENT OFFICE 2,335,146

WELL DRILLING FLUID

Tirey Foster Ford and Albert G. Loomis, Berkeley, Calif., assignors to Shell Development Company, San Francisco, Calif., a corporation of Delaware No Drawing. Application June 20, 1939, Serial No. 280,065

3 Claims. (Cl. 252—8.5)

This invention pertains to drilling fluids used in drilling wells, and is more specifically concerned with a method of chemical treatment, whereby drilling fluids of low viscosity and yield point and of high specific gravity can be obtained.

The drilling fluids which are used in rotary drilling operations consist usually of colloidal suspensions of clay and serve several functions, such as lubricating the drill bit, carrying the rock cuttings to the surface, forming an impervious sheath on the walls of the borehole, and maintaining a sufficient hydrostatic head on the well to prevent an escape of gas from high pressure formations encountered.

A satisfactory drilling fluid must be essentially colloidal in character in order to prevent settling of the cuttings in the borehole, must possess a suitably low viscosity to be circulated without excessive strain by the pumping equipment, a relatively low yield point to allow a ready release of the cuttings and entrained gases in settling pits, and a sufficiently high specific gravity to maintain the desired hydrostatic head on the well and hold down the gas pressures. Weighting materials such as barytes, litharge, iron oxide, etc., are commonly added to drilling fluids to increase their specific gravity.

In order to prepare drilling fluids possessing as far as possible all these desirable properties, it has been customary to treat clay suspensions with various chemical agents, such as alkali hydroxides, carbonates, phosphates, silicates, tannates, humates, etc., or any combination thereof.

It has also been known that drilling fluids may be treated with pyrogenic derivatives of ortho-phosphoric acid, for example, with sodium hexametaphosphate, commercially known as "Calgon," or with sodium or potassium pyrophosphates.

The effect of alkali metaphosphates, and especially of alkali pyrophosphates on the viscosity of drilling fluids appears to be superior to that of all other peptizing or deflocculating agents, reducing in some cases the viscosity of drilling fluids by as much as 82 or 83 percent of the original value. Theoretical considerations strongly indicate that these figures represent substantially the maximum reduction effect which may be achieved by chemical means, and that the possibility of effecting sensibly greater viscosity reductions than those indicated is highly improbable.

The use of alkali meta and pyrophosphates as viscosity reducers for drilling fluids is, however, open to two main objections.

First, the effect of alkali meta and pyrophosphates on the viscosity of drilling fluids is relatively critical, that is, an addition of these agents to drilling fluids in quantities greater than that necessary for a maximum reduction of viscosity results in a reversion to higher viscosities. This necessitates a close and accurate chemical control of the process, and tends to increase its cost.

Second, the effect of alkali meta and pyrophosphates on drilling fluids is not permanent, that is, drilling fluids whose viscosity had been reduced by means of these agents to a low value tend to revert to a high viscosity on standing or while in use in drilling wells, where this effect is even aggravated by the whipping and churning action of the drill string.

It is, therefore, the object of this invention to provide a treating agent for drilling fluids which, while substantially as effective as alkali meta and pyrophosphates in reducing the viscosity of drilling fluids, is not critical with regard to the quantities used, and is capable of producing a viscosity reduction effect of considerably greater permanence than said agents.

It has been found that such a treating agent can be obtained by subjecting pyrogenic derivatives of ortho-phosphoric acid to a further pyrogenic treatment, for example, by fusing together at high temperatures alkali metaphosphates with alkali pyrophosphates, whereby compounds known as polyphosphates are obtained.

The identity of various alkali polyphosphates has been considered by Mellor (Treatise on Inorganic and Theoretical Chemistry), who found that they conform to the general formula $$Na_nP_{n-2}O_{3n-5}$$

The constitution and materials used in the preparation of the various sodium polyphosphates suitable for the purposes of this invention are shown in the following table, the same figures applying substantially also to potassium polyphosphates. These compounds are given only by way of example, since other compounds, such as decaphosphates, tridecaphosphates, nondecaphosphates, etc., may equally well be used:

Table I

| Compound | Formula | Chemicals combined by fusing |
|---|---|---|
| Triphosphate | $Na_5P_3O_{10}$ | $1Na_4P_2O_{15}+6Na_4P_2O_7$ |
| Tetraphosphate | $Na_6P_4O_{13}$ | $1Na_4P_2O_{15}+4Na_4P_2O_7$ |
| Heptaphosphate | $Na_9P_7O_{22}$ | $1Na_4P_2O_{15}+1Na_4P_2O_7$ |
| Nonaphosphate | $Na_{11}P_9O_{28}$ | $4Na_4P_2O_{15}+3Na_4P_2O_7$ |
| Tetradecaphosphate | $Na_{16}P_{14}O_{43}$ | $2Na_4P_2O_{15}+1Na_4P_2O_7$ |
| Eicosaphosphate | $Na_{22}P_{20}O_{61}$ | $3Na_4P_2O_{15}+1Na_4P_2O_7$ |

In applying the treatment of the present invention to oil wells, the above agents, preferably in the form of an aqueous solution, may be added to the drilling fluid at a point near the intake of the circulating pumps, which insures a thorough mixing of the solution with the mud during circulation. The drilling fluid itself may be formed from clays present in the bore, or may be compounded outside the borehole from any clay, such, for example, as bentonite. Weighting materials such as hematite, barytes, galena, etc., may be incorporated in the mud if desired.

The amount of the treating agents is adjusted according to the properties of the drilling fluid, and also to a certain extent according to the character of the strata drilled through, but in general concentrations varying between 0.03 and 0.5 percent by weight of the drilling fluid have been found most satisfactory, although substantially larger amounts may be advantageously used, as will be shown later.

The results obtained by treating ordinary drilling fluids with polyphosphates according to the present invention, as compared to those obtained by using other effective viscosity reducing agents, such as alkali meta or pyrophosphates, are shown in the following tables:

Table II

[110 gms. of Lebec mud (specific gravity 1.19)]

| Quantity of treating agent in c. c. of a 10% solution | Per cent Stormer viscosity reduction for the various treating agents | | | |
|---|---|---|---|---|
| | Sodium pyrophosphate | Sodium polyphosphates | | |
| | | Tetra | Octa | Deca |
| 0.5 | 83 | 74 | 68 | 71 |
| 1.0 | 82 | 82 | 78 | 80 |
| 2.0 | 81 | 82 | 82 | 82 |
| 3.0 | 80 | 82 | 82 | 81 |
| 4.0 | 77 | 80 | 80 | 80 |
| 5.0 | 72 | 79 | 79 | 79 |

From Table II it will be seen that the polyphosphates are as effective as pyrophosphates in reducing the viscosity of drilling fluids, and that they possess, moreover, the additional advantage of causing substantially no reversion to higher viscosities if excess is used. This property is of especial importance, first, because it eliminates the necessity and the cost of close chemical control, and second, because it permits greater quantities of the reagent to be added to the mud without impairing its quality when it is first compounded, thus eliminating the necessity of retreating the mud at frequent intervals as the drilling proceeds.

A comparison between various polyphosphates and other viscosity reducing agents with regard to the permanence of effect on the mud is given in the following tables:

Table III

[Original viscosity of mud: 640 gr. as determined by the Stormer viscometer at 600 R. P. M. 4 c. c. of a 10% treating solution were added to each of the 220 gr. samples, which were then placed in 8 oz. bottles and vigorously shaken by a mechanical shaker.]

| Treating agent | Stormer viscosity in grams and per cent lowering effected by treatment | | |
|---|---|---|---|
| | After treatment | After 5 hours | After 27 hours |
| Sodium metaphosphate | 120 (81%) | 290 (54%) | |
| Sodium pyrophosphate | 115 (82%) | 150 (77%) | 420 (34%) |
| Sodium triphosphate | 118 (81%) | 210 (67%) | 280 (56%) |
| Sodium tetraphosphate | 120 (81%) | 230 (64%) | 320 (50%) |
| Sodium decaphosphate | 120 (81%) | 245 (62%) | 350 (45%) |

Table IV

[Original viscosity of the mud: 525 gr. as determined by the Stormer viscometer at 600 R. P. M. 2 c. c. of a 10% treating solution were added to each 110 gr. of the several samples. 240 gr. of each sample were then placed in 500 c. c. bottles, and subjected to alternating rolling (at about 100 R. P. M.) for 16 hours, and resting for 8 hours.]

| Treating agent | Stormer viscosity in grams and per cent lowering effected by treatment | | |
|---|---|---|---|
| | After treatment | After 80 hours | After 284 hours |
| Sodium pyrophosphate | 100 (81%) | 262 (50%) | 420 (18%) |
| Sodium triphosphate | 100 (81%) | 165 (69%) | 245 (53%) |
| Sodium tetraphosphate | 100 (81%) | 170 (68%) | 330 (37%) |
| Sodium decaphosphate | 100 (81%) | 150 (72%) | 230 (56%) |

From Tables III and IV it will be seen that a much greater permanence of effect is achieved when polyphosphates are used to reduce the viscosity of drilling fluids than when meta or pyrophosphates are used for the same purpose.

It must be also pointed out that when the viscosity of a drilling fluid is reduced with meta or pyrophosphates, and is then permitted to revert to a high value by shaking (which duplicates the actual drilling conditions), the addition of further quantities of the meta and pyrophosphates is practically without effect on the drilling fluid viscosity. By contrast, in an identical drilling fluid reduced with a polyphosphate and thickened to the same viscosity by shaking, relatively small additional quantities of the polyphosphates are sufficient for retreating the drilling fluid and again reducing its viscosity to a desired low value.

It must further be pointed out that although alkali polyphosphates are highly effective in reducing the viscosities of any clay suspensions, weighted or not, such as are used in compounding drilling fluids, their effect is even more marked in suspensions of materials having a similar or related composition, for example, in suspensions of colloidal phosphate rock, or in colloidal clay suspensions weighted with crushed phosphate rock.

Crushed and ground phosphate rock, when suspended in suitable concentrations in an aqueous medium, forms drilling fluids which compare favorably in specific gravity with weighted clay suspensions. Since phosphate rock is a readily available and cheap material, its use for drilling fluids obviates the necessity of using such relatively costly materials as barytes, red lead, etc. However, the viscosity of such heavy phosphate rock suspensions is considerably higher than permissible in drilling, and is not, moreover, susceptible to lowering by treatment with the usual viscosity reducing agents such as alkali hydroxides, silicates, tannates, or any combinations thereof.

Alkali polyphosphates, however, due to a phenomenon of adsorption on the surfaces of the ground phosphate rock particles, are effective in reducing the viscosity of phosphate rock suspensions to low values suitable for drilling.

We claim as our invention:

1. A drilling fluid suitable for drilling wells comprising crushed phosphate rock and an alkali polyphosphate.

2. A drilling fluid for wells, comprising an aqueous suspension of crushed phosphate rock, and a small percentage of a water-soluble polyphosphoric acid compound.

3. In the process of drilling wells, the step of introducing into a well a drilling fluid comprising an aqueous suspension of crushed phosphate rock and a small percentage of a water-soluble polyphosphoric acid compound.

TIREY FOSTER FORD.
ALBERT G. LOOMIS.